(12) United States Patent
Katayama

(10) Patent No.: US 6,736,100 B2
(45) Date of Patent: May 18, 2004

(54) COMPACT TUNED AIR INDUCTION SYSTEM FOR ENGINE

(75) Inventor: Goichi Katayama, Shizuoka (JP)

(73) Assignee: Sanshin Kogyo Kabushiki Kaisha (JP)

( * ) Notice: Subject to any disclaimer, the term of this patent is extended or adjusted under 35 U.S.C. 154(b) by 68 days.

(21) Appl. No.: 10/035,697

(22) Filed: Dec. 24, 2001

(65) Prior Publication Data
US 2002/0117138 A1  Aug. 29, 2002

(30) Foreign Application Priority Data
Dec. 22, 2000  (JP) .................. 2000-390256

(51) Int. Cl.$^7$ .................. F01P 3/02
(52) U.S. Cl. .................. 123/184.21
(58) Field of Search .......... 123/184.21, 184.61, 123/184.53, 184.55, 184.31; 181/204

(56) References Cited

U.S. PATENT DOCUMENTS

| | | | |
|---|---|---|---|
| 4,191,140 A | 3/1980 | Matsumoto et al. | |
| 4,326,600 A | 4/1982 | Okazaki et al. | |
| 4,449,505 A | 5/1984 | Tezuka et al. | |
| 4,488,519 A | 12/1984 | Kishida | |
| 4,497,287 A | * 2/1985 | Schleiermacher et al. | 123/184.53 |
| 4,513,700 A | 4/1985 | Hayashida | |
| 4,550,700 A | 11/1985 | Yoshida et al. | |
| 4,570,744 A | 2/1986 | Hoshiba | |
| 4,649,876 A | 3/1987 | Ohmi et al. | |
| 4,726,337 A | 2/1988 | Yoshida | |
| 4,726,340 A | 2/1988 | Hasegawa et al. | |
| 4,727,829 A | 3/1988 | Kondo et al. | |
| 4,760,703 A | 8/1988 | Minami et al. | |
| 4,765,285 A | 8/1988 | Kobayashi | |
| 4,766,853 A | 8/1988 | Iwanami | |
| 4,809,647 A | 3/1989 | Masumoto et al. | |
| 4,827,722 A | 5/1989 | Torigai | |
| 4,827,879 A | 5/1989 | Ohmi et al. | |
| 4,898,144 A | 2/1990 | Kobayashi et al. | |
| 4,900,343 A | 2/1990 | Miniami et al. | |

(List continued on next page.)

OTHER PUBLICATIONS

Co-pending patent application: Ser. No. 09/965,650, filed Sep. 26, 2001, titled Air Induction System for Engine, in the name of Hitoshi Watanabe and Hiroyuki Tsunekawa.
Co-pending patent application: filed Oct. 26, 2001, titled Air Induction System for Multi-Cylinder Engine, in the name of Goichi Katayama.
Co-pending patent application: Ser. No. 09/664,514, filed Sep. 18, 2000, in the name of Hitoshi Watanabe.
Co-pending patent application: Ser. No. 09/681,372, filed Mar. 26, 2001, titled Intake Control Device for Multi-Cylinder V-Type Engine, in the name of Minoru Suzuki.
Propulsion test Technical Knockout, Anniversary Issue *Trailer BOATS* magazine, Jul. 2001, pp. 30–33.
Propulsion test, *Trailer BOATS* magazine, Aug. 2001, pp. 26–30.
Honda Marine, BF225.

*Primary Examiner*—Henry C. Yuen
*Assistant Examiner*—Jason Benton
(74) *Attorney, Agent, or Firm*—Knobbe, Martens, Olson & Bear, LLP.

(57) ABSTRACT

An internal comustion engine has an air induction system that provides an intake passage and an intake silencer, wherein there are a plurality of openings between the silencer and the intake passage. The openings can be selectively closed so as to effectively lengthen or shorten the flow path through the intake passage. upstream portions of the intake passage are disposed within the intake silencer so as to facilitate compactness of the induction system. The openings are closed during low and medium engine speeds, and are opened during high engine speeds.

36 Claims, 7 Drawing Sheets

U.S. PATENT DOCUMENTS

| | | |
|---|---|---|
| 5,000,130 A | 3/1991 | Yamada |
| 5,005,534 A | 4/1991 | Washizu et al. |
| 5,005,536 A | 4/1991 | Suzuki et al. |
| 5,005,553 A | 4/1991 | Washizu et al. |
| 5,007,386 A | 4/1991 | Washizu et al. |
| 5,018,485 A | 5/1991 | Washizu et al. |
| 5,048,471 A * | 9/1991 | Takii et al. ............. 123/184.55 |
| 5,063,885 A * | 11/1991 | Yoshioka ............... 123/184.34 |
| 5,074,257 A | 12/1991 | Amano et al. |
| 5,092,284 A | 3/1992 | Yamada |
| 5,127,370 A * | 7/1992 | Suzuki et al. ........... 123/184.37 |
| 5,133,307 A * | 7/1992 | Kurihara ................ 123/184.31 |
| 5,370,098 A * | 12/1994 | Iida ............................ 123/527 |
| 5,476,402 A | 12/1995 | Nakai et al. |
| 5,513,606 A | 5/1996 | Shibata |
| 5,515,822 A | 5/1996 | Kobayashi et al. |
| 5,551,394 A | 9/1996 | Yoshikawa |
| 5,596,962 A * | 1/1997 | Tsunoda et al. ....... 123/184.39 |
| 5,657,727 A | 8/1997 | Uchida |
| 5,787,851 A | 8/1998 | Sakurai et al. |
| 5,829,402 A | 11/1998 | Takahashi et al. |
| 5,830,021 A | 11/1998 | Takahashi et al. |
| 5,855,193 A | 1/1999 | Takahashi |
| 5,911,211 A | 6/1999 | Uchida |
| 5,941,205 A | 8/1999 | Hiraoka et al. |
| 6,019,078 A | 2/2000 | Kimura et al. |
| 6,024,188 A * | 2/2000 | Yamaguchi et al. ... 123/184.61 |
| 6,030,262 A | 2/2000 | Okamoto et al. |
| 6,062,927 A | 5/2000 | Hiraoka et al. |
| 6,109,231 A | 8/2000 | Watanabe et al. |
| 6,125,820 A * | 10/2000 | Hiraoka ................. 123/184.53 |
| 6,148,794 A | 11/2000 | Tsuzuku et al. |
| 6,168,484 B1 * | 1/2001 | Mishima et al. ....... 123/184.21 |
| 6,216,809 B1 | 4/2001 | Etou et al. |
| 6,227,172 B1 | 5/2001 | Katayama et al. |
| 6,227,184 B1 | 5/2001 | Katayama et al. |
| 6,260,528 B1 * | 7/2001 | Pringle et al. ......... 123/184.55 |
| 6,273,047 B1 | 8/2001 | Yoshikawa et al. |
| 6,286,472 B1 | 9/2001 | Takahashi et al. |
| 6,298,815 B1 | 10/2001 | Kashima et al. |

* cited by examiner

COMPACT TUNED AIR INDUCTION SYSTEM FOR ENGINE

PRIORITY INFORMATION

This application is based on and claims priority to Japanese Patent Application No. 2000-390256, filed Dec. 22, 2000, the entire contents of which are hereby expressly incorporated by reference.

BACKGROUND OF THE INVENTION

1. Field of the Invention

The present invention relates generally to an air induction system for an internal combustion engine, and more particularly to an improved and compact air induction system that is tuned to enhance engine performance at both low and high speeds.

2. Description of the Related Art

An internal combustion engine typically includes an air induction system through which air is introduced into one or more combustion chambers of the engine. The induction system typically includes an intake silencer and one or more intake conduits. The silencer coordinates or smooths the air flow and reduces induction system noise. The conduits communicate air from the silencer to the combustion chambers.

The length of the intake conduits play an important role in determining the torque characteristics of the engine. Generally, relatively long intake conduits improve engine torque at low and/or middle engine speeds, and relatively short intake conduits are desired to improve engine torque at high engine speeds.

Efforts have been made to provide an engine air induction system having both long and short intake conduits so as to improve engine torque characteristics in both low and high engine speed ranges. Such induction systems typically include extra parts and require more space than traditional systems. An especially difficult problem arises when an engine must be placed within a strictly confined space. For example, a typical outboard motor includes an engine surrounded by a protective cowling. Space for the intake conduits and air induction system is extremely limited, and enlarging the cowling to make a roomier space is not an acceptable option because outboard motors are required to be as compact as possible for carriage and storage.

SUMMARY OF THE INVENTION

The preferred embodiments of the present invention provide an outboard motor engine air induction system which can be tuned to improve engine torque characteristics at both low/medium engine speeds and high engine speeds without significantly increasing the space required by the induction system.

In accordance with one aspect, the present invention comprises an outboard motor comprising a power head having a cowling enclosing a space. An engine is disposed within the cowling and is configured to drive a substantially vertically oriented crankshaft, and. An air induction system is also disposed within the cowling and is configured to deliver air from the space into a combustion chamber of the engine. The air induction system comprises an intake silencer and at least one intake runner. The intake silencer has an outer wall, an inlet port through the wall for drawing air from the space into the intake silencer, and a runner extension pipe integrally formed with the intake silencer. The runner extension pipe has an upstream end and a downstream end. The upstream end opens within the intake silencer and the downstream end opens into the intake runner. A runner hole is formed through the outer wall of the intake silencer and communicates with the intake runner at a point adjacent the downstream end of the runner extension pipe. A valve is disposed in the outer hole and is configured to selectively open and close the hole. When the valve is closed, an intake passage is defined from the upstream end of the runner extension pipe to a downstream end of the runner pipe. When the valve is opened, the intake passage is defined from the runner hole to the downstream end of the runner pipe.

In accordance with another aspect, the intake silencer additionally comprises a dividing wall dividing the silencer into a first chamber and a second chamber. At least one connection passage is formed through the dividing wall, and a dividing wall valve within the connection passage selectively closes the passage.

In accordance with yet another aspect of the present invention, an air induction system is provided for improving the torque characteristics of an outboard marine engine. The air induction system is also configured to be positioned within a limited space between the engine and an associated protective cowling. The induction system comprises an intake silencer and an intake manifold. The intake manifold has at least one generally linear runner extending from the silencer to the engine. The runner opens into the silencer at a runner opening. A runner opening valve is disposed in the runner opening and is configured to selectively close the opening. A runner extension has an upstream end opening into the silencer and a downstream end opening into the runner so that an intake passage between the silencer and the engine is effectively lengthened when the runner opening valve is closed.

In accordance with a further aspect, an air induction system is provided for improving the torque characteristics of an engine. The induction system comprises an intake silencer and an intake manifold, the intake manifold comprising at least one generally linear runner extending from the silencer to the engine. The runner opens into the silencer at a runner opening. A runner opening valve is disposed in the runner opening and is configured to selectively close the opening. A runner extension is provided and has an upstream end opening into the silencer and a downstream end opening into the runner.

In accordance with a still further aspect, a method of improving torque characteristics of an outboard motor engine at low, middle and high engine speeds is provided. An intake silencer and an intake conduit are provided. The intake conduit extends from the intake silencer to an intake passage of the engine. A second intake conduit extends from the intake silencer to a portion of the first intake conduit. The method includes automatically closing a valve between the silencer and the first intake conduit during low and medium engine speeds so as to provide a long flow path extending from the silencer through the second intake conduit and first intake conduit to the intake passage of the engine. The method further includes automatically opening the valve between the silencer and the first intake conduit during high engine speeds so as to provide a shortened flow path extending from the silencer through the first intake conduit to the intake passage of the engine.

In accordance with a further aspect of the above method, the intake silencer comprises two chambers separated by a dividing wall, and a balancing passage is formed through the wall. A balancing valve is positioned in the balancing passage. The method additionally includes closing the balancing valve at low speeds so that each chamber functions as a separate intake silencer, and opening the balancing valve at high speeds so that the effective volume of the intake silencer comprises the collective volume of the two chambers.

BRIEF DESCRIPTION OF THE DRAWINGS

These and other features, aspects and advantages of the present invention will now be described with reference to the drawings of preferred embodiments, which embodiments are intended to illustrate and not to limit the present invention. The drawings comprise seven figures.

DETAILED DESCRIPTION OF THE PREFERRED EMBODIMENTS

Overall Construction

Figure 1:
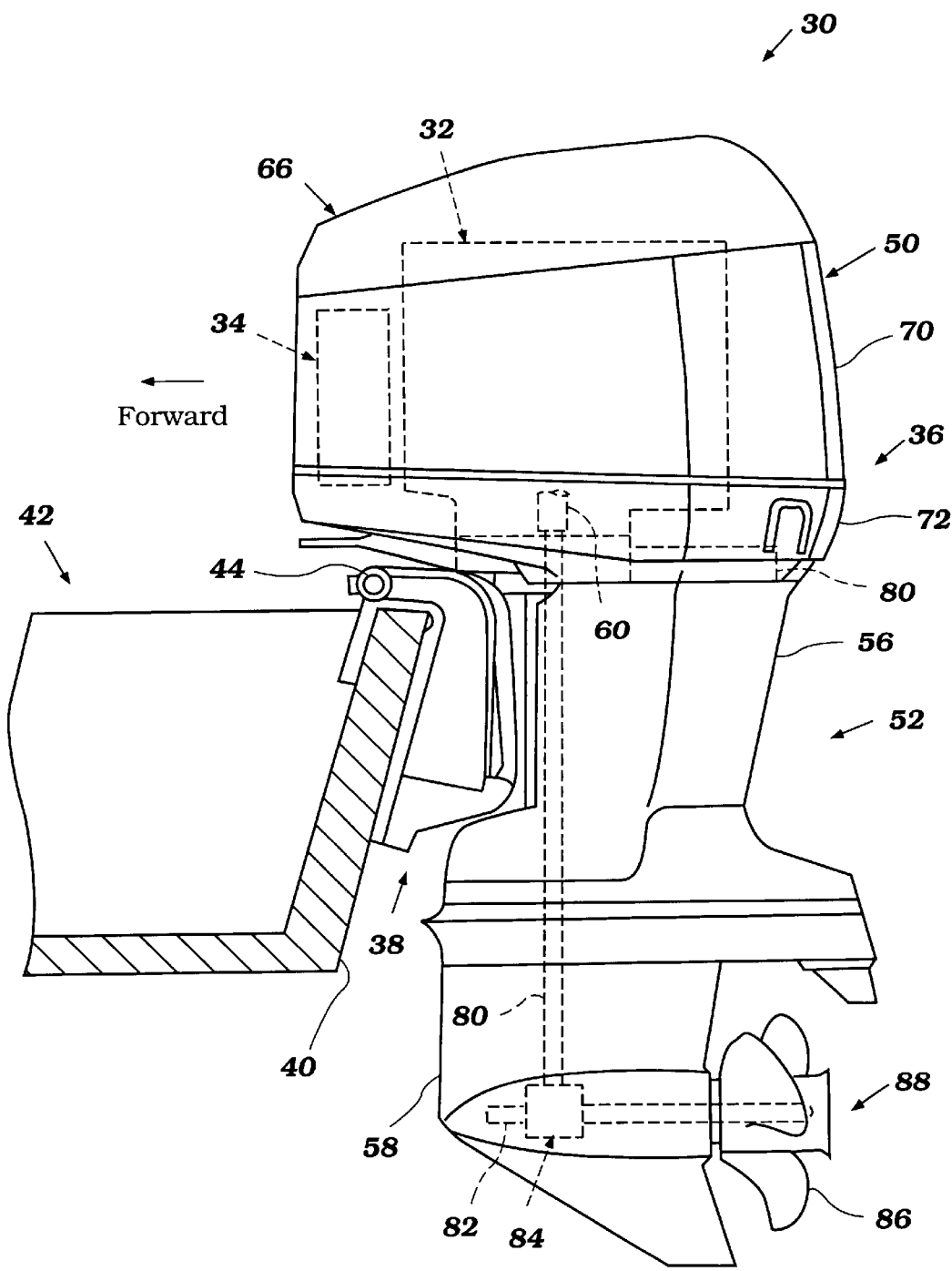
FIG. 1 is a side elevation view of an outboard motor employing an engine that has an air induction system. An associated watercraft is partially shown in section.

With primary reference to FIG. 1, an overall construction of an outboard motor 30 that employs an internal combustion engine 32 having an air induction system 34 configured in accordance with certain features, aspects and advantages of the present invention will be described.

In the illustrated arrangement, the outboard motor 30 generally comprises a drive unit 36 and a bracket assembly 38. The bracket assembly 38 supports the drive unit 36 on a transom 40 of an associated watercraft 42 and places a marine propulsion device in a submerged position with the watercraft 42 resting relative to a surface of a body of water. The bracket assembly 38 is configured in any suitable manner, and preferably comprises a swivel bracket, a clamping bracket, a steering shaft and a pivot pin 44.

As used through this description, the terms "forward," "forwardly" and "front" mean at or to the side where the bracket assembly 36 is located, unless indicated otherwise or otherwise readily apparent from the context use. The arrows indicate the forward direction. The terms "rear," "reverse," "backwardly " and "rearwardly" mean at or to the opposite side of the front side.

As used in this description, the term "horizontally" means that the subject portions, members or components extend generally in parallel to the water surface (i.e., generally normal to the direction of gravity) when the associated watercraft 42 is substantially stationary with respect to the water surface and when the drive unit 36 is not tilted (i.e., is placed in the position shown in FIG. 1). The term "vertically" in turn means that portions, members or components extend generally normal to those that extend horizontally.

The drive unit 36 comprises a power head 50 and a housing unit 52, which includes a driveshaft housing 56 and a lower unit 58. The power head 50 is disposed atop the housing unit 52 and includes the engine 32, which drives a crankshaft 60. The engine 32 is positioned within a generally enclosed cavity 62 defined by a protective cowling assembly 66, which preferably is made of plastic. As such, the cowling assembly 66 generally protects the engine 32 from environmental elements. The air induction system 34 conveys air from within the cowling 66 to the engine 32 for combustion therein.

In the outboard motor 30 shown in FIG. 1, the engine 32 and induction system 34 are depicted in phantom lines because a variety of engine and induction system configurations can be used. For example, the embodiment depicted in FIGS. 2–4 includes an engine 32 having an in-line arrangement, and the embodiment described in FIGS. 5–7 includes an engine 232 having a V-type arrangement. Both of these engine types can be used with the outboard motor 30 shown in FIG. 1. It is to be understood that these engine types merely exemplify types of engines on which various aspects and features of the present invention can suitably be used. Engines having various numbers of cylinders, having other cylinder arrangements (opposing, etc.) and operating on other combustion principles (e.g., crankcase compression two stroke or rotary) also can employ various features, aspects and advantages of the present invention.

Although engines and air induction systems are described herein in connection with an outboard motor, it is to be understood that such induction systems and engines can have particular utility with other types of marine drives (i.e., inboard motors, inboard/outboard motors, etc.) and also certain land vehicles such as lawn mowers, go-karts, motorcycles, all-terrain vehicles and the like. Furthermore, such an engine and intake system can be used as a stationary engine for some applications that will become apparent to the person of ordinary skill in the art.

With continued reference to FIG. 1, the protective cowling assembly 66 preferably comprises a top cowling member 70 and a bottom cowling member 72. The top cowling member 70 preferably is detachably affixed to the bottom cowling member 72 by a coupling mechanism so that a user, operator, mechanic or repairperson can access the engine 32 for maintenance or for other purposes. In some arrangements, the top cowling member 70 is hingedly attached to the bottom cowling member 72 such that the top cowling member 70 can be pivoted away from the bottom cowling member for access to the engine 32. Preferably, such a pivoting allows the top cowling member 70 to be pivoted about the rear end of the outboard motor 30, which facilitates access to the engine 32 from within the associated watercraft 42.

The bottom cowling member 72 preferably has an opening through which an upper portion of an exhaust guide member 76 extends. The exhaust guide member 76 preferably is made of aluminum alloy and is affixed atop the driveshaft housing 56. The bottom cowling member 72 and the exhaust guide member 76 together generally form a tray. The engine 32 is placed onto this tray and can be affixed to the exhaust guide member 76. The exhaust guide member 76 also defines an exhaust discharge passage through which burnt charges (e.g., exhaust gases) from the engine 32 pass.

The driveshaft housing 56 is positioned below the exhaust guide member 76 to support a driveshaft 80 which extends generally vertically through the driveshaft housing 56. The driveshaft 80 is journalled for rotation in the driveshaft housing 56 and is driven by the crankshaft 60. The driveshaft housing 56 preferably defines an internal section of an exhaust system that leads the majority of engine exhaust gases to the lower unit 58. The internal section preferably also includes an idle discharge portion that is branched off from a main portion of the internal section and leads to an idle discharge port that preferably is formed through the driveshaft housing 56. In this manner, exhaust gases generated when the engine 32 is idling are discharged directly to the atmosphere through the idle discharge port.

The lower unit 58 depends from the driveshaft housing 56 and supports a propulsion shaft 82 that is driven by the driveshaft 80 through a transmission 84. The propulsion shaft 82 extends generally horizontally through the lower unit 58 and is journalled for rotation. A marine propulsion device is attached to the propulsion shaft 82. In the illustrated arrangement, the propulsion device is a propeller 86 that is affixed to an outer end of the propulsion shaft 82. The propulsion device, however, can take the form of a dual counter-rotating system, a hydrodynamic jet, or any of a number of other suitable propulsion devices.

The transmission 84 preferably is provided between the driveshaft 80 and the propulsion shaft 82, which lie generally normal to each other (i.e., at a 90° shaft angle), and couples together the two shafts 80, 82 by bevel gears. A clutch mechanism allows the transmission 84 to change the rotational direction of the propeller 86 among forward, neutral or reverse.

The lower unit 58 also defines an internal section of the exhaust system that is connected with the internal exhaust section of the driveshaft housing 56. A discharge port 88 is formed through the hub of the propeller 86. At engine speeds above idle, the exhaust gases generally are routed through the discharge port 88 and to the body of water surrounding the outboard motor 30. It is to be understood that the exhaust system can include a catalytic device at any location in the exhaust system to purify the exhaust gases.

Outboard Motor with an In-Line Engine Having a Novel Air Induction System

Figure 2:
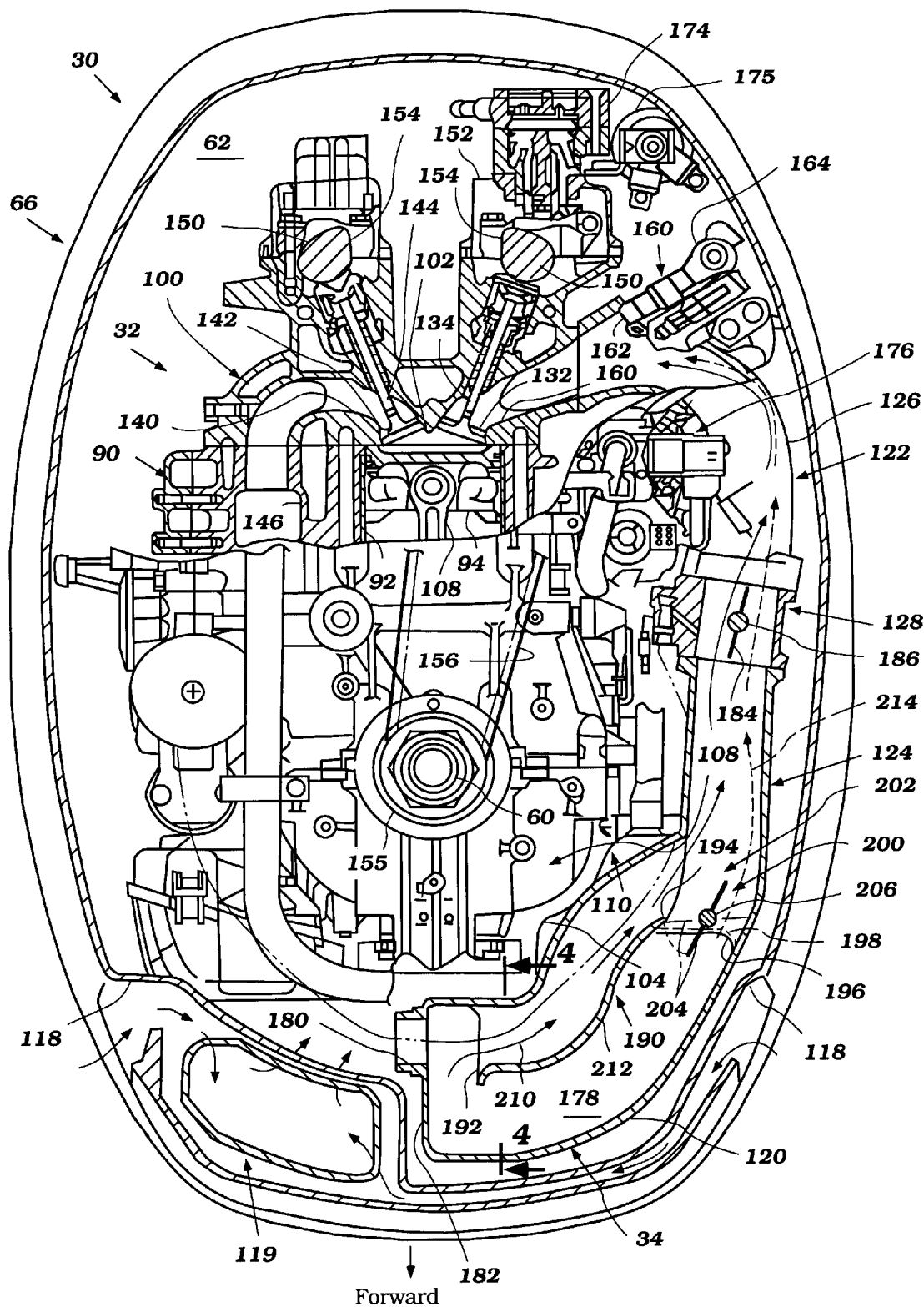
FIG. 2 is a top plan view of an embodiment of an outboard motor with a top cowling member and some components of the engine and air induction system shown in section.
Figure 3:
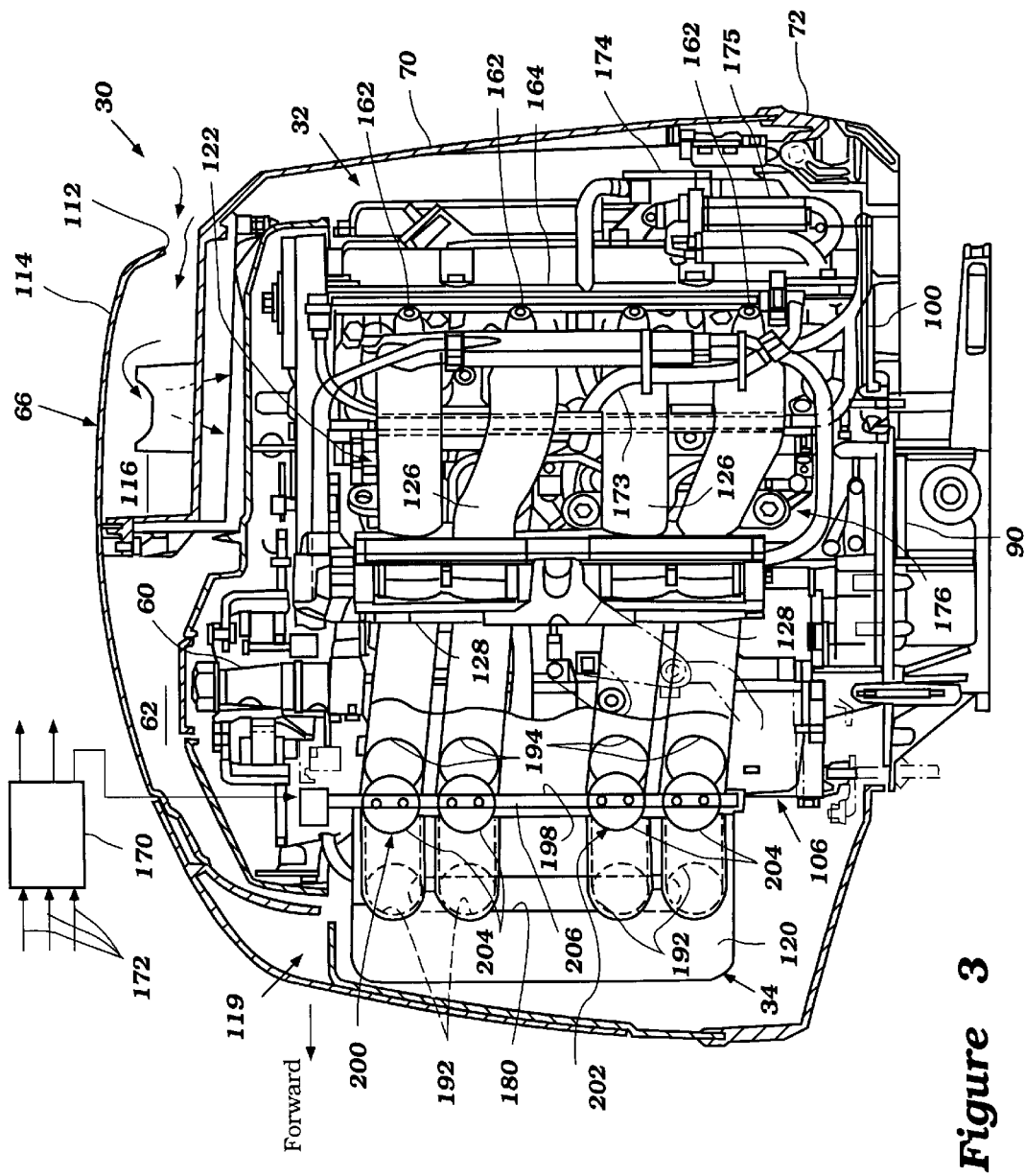
FIG. 3 is a port side view of the outboard motor of FIG. 2, with the cowling member cut away and some components shown in phantom lines.
Figure 4:
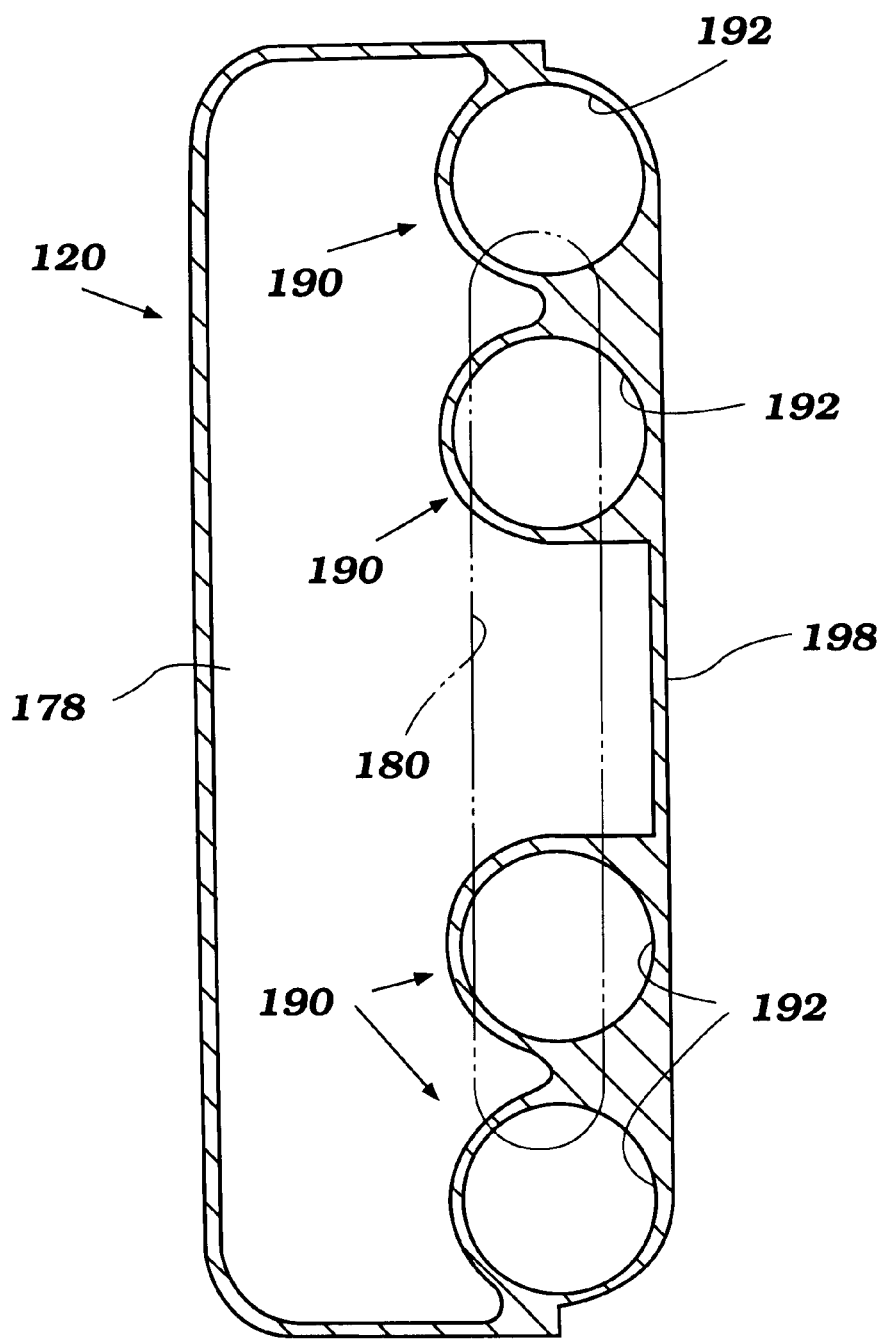
FIG. 4 is a sectional view of the air induction system taken along the line 4—4 of FIG. 2.

With reference next to FIGS. 2–4, one embodiment of an outboard motor 30 has a four-cylinder, in-line type engine. The engine 32 has a cylinder block 90 defining four cylinder bores 92. The cylinder bores 92 extend generally horizontally and are disposed in a line vertically on top of one another. A piston 94 reciprocates within each cylinder bore 92. A cylinder head member 100 is affixed to a rear end of the cylinder block 90. The cylinder head member 100 together with the associated pistons 94 and cylinder bores 92 preferably define four combustion chambers 102.

A crankcase member 104 encloses a front end of the cylinder block 90 and, together with the cylinder block 90, defines a crankcase chamber 106. The crankshaft 60 extends generally vertically through the crankcase chamber 106 and can be journalled for rotation about a rotational axis by several bearing blocks. Connecting rods 108 couple the crankshaft 60 with the respective pistons 94 in a suitable manner so that reciprocal movement of the pistons 94 rotates the crankshaft 60.

The cylinder block 90 (or individual cylinder bodies), the cylinder head member 100 and the crankcase member 104 together define an engine body 110. Preferably, at least these major engine portions 90, 100, 104 are made of aluminum alloy. The aluminum alloy advantageously increases strength over cast iron while decreasing the weight of the engine body 110.

With specific reference to FIG. 3, the top cowling member 70 preferably has a rear intake opening 112 defined through an upper rear portion. A rear intake member 114 with one or more air ducts is unitarily formed with or is affixed to the top cowling member 70. The rear intake member 114, together with the upper rear portion of the top cowling member 70, generally defines a rear air intake space 116. Ambient air is drawn into the closed cavity 62 via the rear intake opening 112 and the air ducts of the rear intake member 114 as indicated by the arrows of FIG. 3. As shown also in FIG. 2, front 118 air inlets through the cowling are also provided so as to draw ambient air through a front intake member 119 and into the cavity 62 within the cowling 66.

With particular reference to FIGS. 2 and 3, the engine 32 also includes an air induction system 34, which delivers air from within the cavity 62 to the combustion chambers 102 of the engine. In the illustrated embodiment, the induction system 34 includes an intake silencer 120 and an intake manifold 122. The intake manifold 122 includes a plurality of conduits or runners 124, 126 and throttle bodies 128. The intake silencer 120 serves to coordinate or smooth air flow and to reduce intake noise. The intake manifold 122 conducts air from the intake silencer 120 to inner intake passages 130 formed in the cylinder head 100. The air induction system will be discussed in more detail below.

As just discussed, the cylinder head 100 comprises a plurality of inner intake passages 130. As shown specifically in FIG. 2, the intake passages 130 conduct air to intake ports 132, which open into respective combustion chambers 102. Intake valves 134 are slidably disposed in the cylinder head 100 to selectively open and close the intake ports 132.

With continued reference to FIG. 2, the engine 32 further comprises an exhaust system that routes burnt charges, i.e., exhaust gases, from the combustion chamber 102 to a location outside of the outboard motor 30. The cylinder head member 100 defines a set of inner exhaust passages 140 that communicate with the combustion chambers 102 through one or more exhaust ports 142 defined in the inner surface of the cylinder head member 100. The exhaust ports 142 can be selectively opened and closed by exhaust valves 144. The construction of each exhaust valve 144 and the arrangement of the exhaust valves 144 are substantially the same as the intake valve 134 and the arrangement thereof. Thus, further description of these components is deemed unnecessary.

An exhaust manifold 146 preferably is defined within the cylinder block 90 and extends generally vertically along the cylinder bores 92. The exhaust manifold 146 communicates with the combustion chambers 102 through the inner exhaust passages 140 and the exhaust ports 142. The exhaust manifold 146 is coupled with the exhaust discharge passage of the exhaust guide member 76.

A valve cam mechanism preferably is provided for actuating the intake and exhaust valves 134, 144. Preferably, the valve cam mechanism includes two camshafts 150 which extend generally vertically and are journalled for rotation on and within a cylinder head cover member 152. The camshafts 150 have cam lobes 154 to push valve lifters that are affixed to the respective ends of the intake and exhaust valves 134, 144 in any suitable manner. The cam lobes 154 repeatedly push the valve lifters in a timed manner, which is in proportion to the engine speed. The movement of the lifters generally is timed by rotation of the camshafts 150 to appropriately actuate the intake and exhaust valves 134, 144.

A camshaft drive mechanism preferably is provided for driving the valve cam mechanism. The intake and exhaust camshafts 150 are provided with intake and exhaust driven sprockets (not shown) positioned atop the intake and exhaust camshafts, respectively, while the crankshaft 60 has a drive sprocket 155 positioned atop thereof. A timing chain or belt 156 is wound around the driven sprockets and the drive sprocket 155. The crankshaft 60 thus drives the respective camshafts 150 through the timing chain 156 in the timed relationship. Because the camshafts 150 must rotate at half of the speed of the rotation of the crankshaft 60 in a four-cycle engine, a diameter of the driven sprockets is twice as large as a diameter of the drive sprocket 155.

The engine 32 preferably has an indirect, port or intake passage fuel injection system 160. The fuel injection system 160 preferably comprises four fuel injectors 162 with one fuel injector allotted for each one of the respective combustion chambers 102. Preferably, the fuel injectors 162 are mounted on the most-downstream portions of the intake runners 126. A fuel rail 164 delivers fuel to the injectors 194.

Each fuel injector 162 preferably has an injection nozzle directed toward the inner intake passage 130 for combustion in the combustion chambers 102. Operation of the fuel injectors 162 is controlled by an electronic control unit (ECU) 170, which controls both the initiation timing and the duration of the fuel injection cycle of the fuel injectors 162 so that the nozzles spray a proper amount of fuel each combustion cycle. The fuel injectors 162 are connected to the ECU 170 through appropriate control lines 172.

Typically, a fuel supply tank disposed on a hull of the associated watercraft 42 contains the fuel. Fuel is delivered through a fuel delivery conduit 173 to at least one fuel pump 174 and through a fuel filter 175. The fuel pump 174 pressurizes the fuel, which is delivered to the fuel rail 162 and to the fuel injectors 162. A vapor separator 176 preferably is provided to separate vapor from the fuel. It is to be understood that a direct fuel injection system that sprays fuel directly into the combustion chambers can be used in place of the indirect fuel injection system described above. Additionally, any other charge forming devices, such as carburetors, can be used.

The ECU 170 controls at least the fuel injection system 160 and the ignition system based upon signals received from sensors through sensor lines 172. Such sensors can include, for example, a crankshaft angle position sensor, an air intake pressure sensor, a throttle valve position sensor, and an engine speed sensor. Of course, other sensors are available and the sensors can be selected in accordance with control strategies planned for the ECU 170. Typically, the ECU 170 has control maps or functional equations to practice the control strategies.

The engine 32 of course can comprise other systems, devices, components and members. For example, a water cooling system and a lubrication system can be provided. These systems, devices, components and members are conventional and further descriptions of them are deemed unnecessary.

In the illustrated engine 32, the pistons 94 reciprocate between top dead center and bottom dead center. When the crankshaft 60 makes two rotations, the pistons 94 generally move from the top dead center position to the bottom dead center position (the intake stroke), from the bottom dead center position to the top dead center position (the compression stroke), from the top dead center position to the bottom dead center position (the power stroke) and from the bottom dead center position to the top dead center position (the exhaust stroke). During the four strokes of the pistons 94, the camshafts make one rotation and actuate the intake and exhaust valves 134, 144 to open the intake and exhaust ports during the intake stroke and the exhaust stroke, respectively.

Generally, during the intake stroke, air is drawn into the combustion chambers 102 through the air induction system 34 and fuel is injected into the inner intake passages 130 by the fuel injectors 162. The air and the fuel thus are mixed to form an air/fuel charge, which is drawn into the combustion chambers 102. The air/fuel ratio is generally held in the optimum condition under control of the ECU 170 by determining an amount of the fuel corresponding to an amount of the air. Slightly before or during the power stroke, the respective spark plugs ignite the compressed air/fuel charge in the respective combustion chambers 102. The air/fuel charge thus rapidly burns during the power stroke so as to move the pistons 94. The burnt charge, i.e., exhaust gases, are discharged from the combustion chambers 102 during the exhaust stroke.

As shown in FIGS. 2–4, the intake silencer 120 preferably is positioned generally in front of the crankcase 160. The intake silencer 120 comprises outer walls which enclose a space 178 therewithin. An elongate inlet port 180 is formed through a wall 182 of the intake silencer 120, so that air from within the cavity 62 can be drawn into the silencer 120.

The intake manifold 122 comprises a series of four upstream runner pipes 124 and a series of four downstream runner pipes 126. The upstream runner pipes 124 receive air from the intake silencer 120 and direct it to the throttle bodies 128, which regulate airflow therethrough. From the throttle bodies 128, the air flows through the downstream runner passages 126. In a preferred embodiment, the downstream runner pipes 126 are bifurcated.

Each throttle body 128 preferably contains a throttle valve 184. Preferably, the throttle valve 184 is a butterfly valve that has a valve shaft 186 (FIG. 3) journalled for pivotal movement about a generally horizontal pivot axis. The valve shaft 186 can also be pivotable about a generally vertical axis. The valve shaft 186 preferably is connected with a control linkage that can be connected to an operational member such as, for example, a throttle lever provided on the watercraft 42 or otherwise proximate the operator of the watercraft 42. The operator can control the opening degree, i.e., angular position, of the throttle valve 184 through the control linkage. The throttle valve 184 can regulate or measure an amount of air that flows through the induction system 34 to the combustion chambers 102 in response to the operation of the operational member by the operator. Normally, the greater the opening degree, the higher the rate of airflow and the higher the engine speed.

Four runner extension pipes 190 are disposed within the silencer 120. The runner extension pipes 190 extend generally horizontally and are arranged generally vertically one above another. The runner extension pipes 190 each have an upstream opening 192 which opens into the space 178 within the intake silencer 120, and a downstream opening 194, which opens into the corresponding upstream runner 124 of the intake manifold 122. As such, air from within the intake silencer 120 can flow through the upstream opening 192 and through the runner extension pipe 190 before entering the upstream runner 124. In the illustrated embodiment, the upstream opening 192 is trumpeted.

As shown specifically in FIG. 2, a series of four openings 196 are formed through a rear wall 198 of the intake silencer 120 and communicate with associated upstream runner members 124. As described below, each upstream runner 124 selectively communicates with the silencer 120 through both a runner extension pipe 190 and a rear wall opening 196.

The rear wall openings 196 of the intake silencer 120 are selectively closeable with a runner opening valve assembly 200. As illustrated in FIG. 2, the valve assembly 200 generally comprises four butterfly valves 202, each of which include a valve plate mounted upon a rotatable shaft 206. The plate 204 rotates with the shaft 206 so as to open and close the opening 196. With reference also to FIG. 3, the valve shaft 206 preferably extends generally vertically and supports all four butterfly valves 202 that are positioned in the rear wall openings 196. A motor 208, such as a DC motor or stepper motor, is positioned atop the valve shaft 206 and selectively rotates the valve shaft 206 to open and close the valves 202.

Operation of the Air Induction System

When the valves 202 are closed, the path from the silencer 120 to the upstream runners 124 through the openings 196 is closed. As such, the only path from the intake silencer 120 to the upstream runners 124 is through the runner extension pipes 190. As shown particularly in FIG. 2, this arrangement provides a relatively long flow path 210 (shown in dark arrows) from the silencer 120 to the combustion chamber 102. When the runner opening valve 200 is closed, the intake passage extends from the upstream opening 192 through the runner extension pipe 190, upstream runner pipe 124, throttle body 128, downstream runner pipe 126, inner intake passage 130 of the cylinder head into the combustion chamber 102. The length of the intake passages has been effectively increased to include the length of the runner extension pipes 190 as well as the runner pipes 124, 126. As discussed above, relatively long intake passages provide increased torque performance for engines at low and medium speeds.

When the runner valve 202 is closed, the intake passage is considerably long and provides excellent torque performance at low to medium speeds. Additionally, when the valve 202 is closed, the valve plate 204 is substantially continuous with an inner wall 212 of the runner extension pipes 190. As such, there is little or no disturbance of the airflow at the transition from the runner extension pipe 190 into the upstream runners 124. There is low flow resistance, and the formation of flow disturbances, such as eddys, at the transition between the runner extension pipe 190 and upstream runner 124 is reduced or eliminated.

When the runner valves 202 are open airflow is not constrained to flowing through the runner extension pipes 192, and air can flow directly from the intake silencer 120 into the upstream runner pipe 124. Thus, with the runner valves 200 open, the length of the flow path 214 (shown in dashed arrows) is effectively shortened so as to enhance engine torque performance at high speeds.

As discussed above, the motor 208 rotates the valve shaft 206 to open and close the runner valves 202. As shown in FIG. 3, the ECU 170 controls the motor 208 so as to open the valves 202 only upon detection of certain criteria such as, for example, relatively high engine speed. Additionally, the valves 202 can be incrementally opened in connection with incrementally increasing engine speed. As discussed above, the ECU 170 controls engine functions in accordance with a control strategy such as a map. In one embodiment, valve opening degrees are tied to specific engine speeds or ranges of speeds.

In the illustrated embodiment, the intake silencer 120 and runners 124, 126 are preferably made of plastic in any conventional manner such as, for example, by injection molding. Other materials such as, for example, aluminum alloy and other methods such as, for example, a die casting method can be applied to form these members. As best shown in FIGS. 2 and 4, the illustrated runner extension pipes 190 are formed integrally with the intake silencer 120. It is to be understood, however, that all of the intake pipes 190, 124, 126 can be formed separately from the intake silencer 120, if desired.

A significant feature of the preferred motor embodiments is that the improved engine air induction system is not only tuned to increase torque performance at various engine speeds, but is also compact and does not significantly increase the space required by the induction system. In the illustrated embodiment, the runner extension pipes 190 are co-formed with the intake silencer 120 and are substantially fully contained within the intake silencer 120.

In other embodiments (not shown), the runner extension pipes can be formed separately from the intake silencer, and can be partially contained within the intake silencer or not contained at all therewithin. For example, an upstream inlet of the runner extension pipe can open into the intake silencer. A downstream opening of the runner extension pipe can also open into the silencer, but is selectively closeable so as to change the effective length of the intake passage.

Outboard Motor with a V-type Engine Having a Novel Air Induction System

Figure 5:
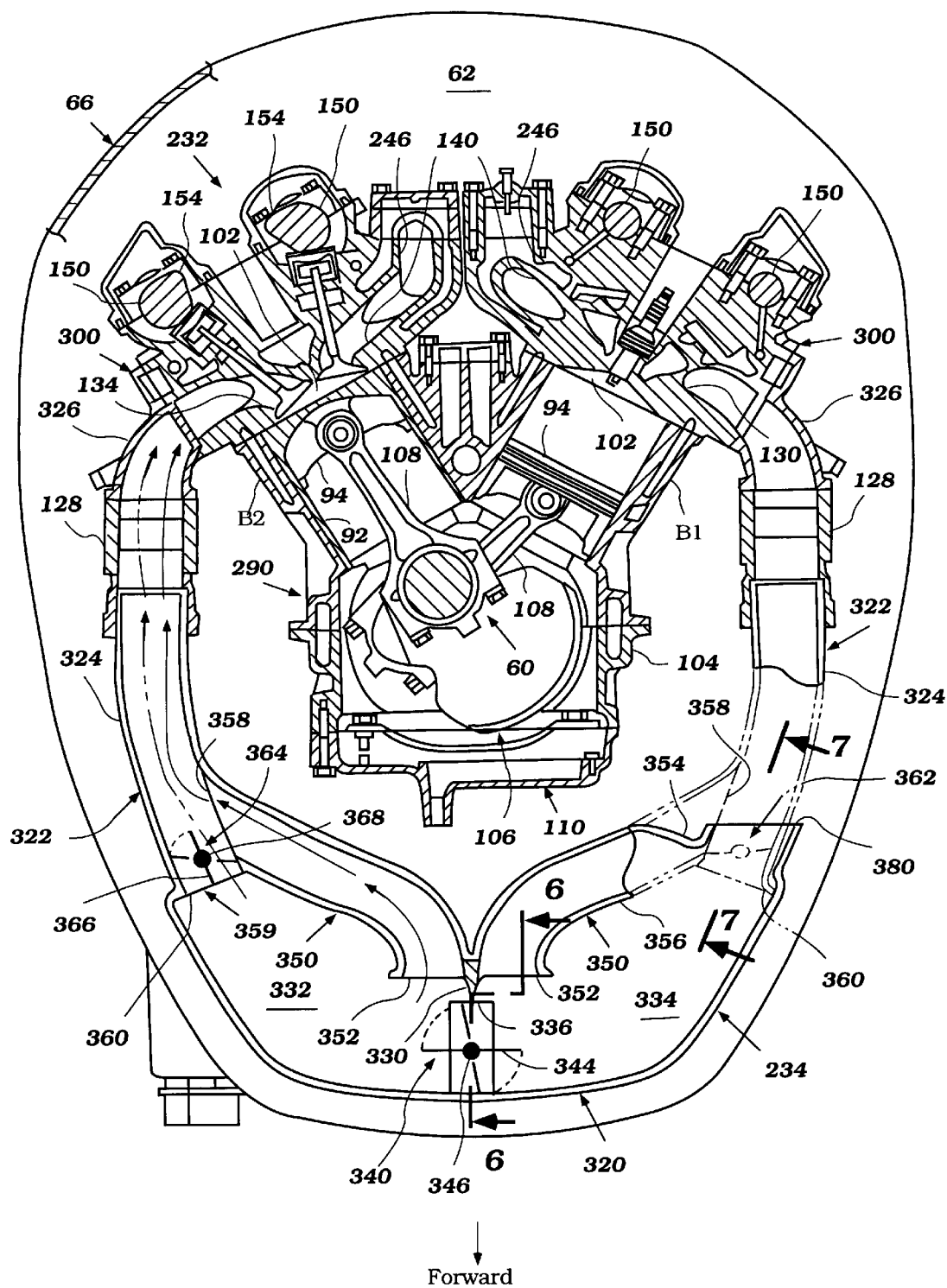
FIG. 5 is a top plan view of another embodiment of an outboard motor having a V-type engine, and the engine and the induction system are shown in section, with a portion of the induction system shown in phantom lines.
Figure 6:
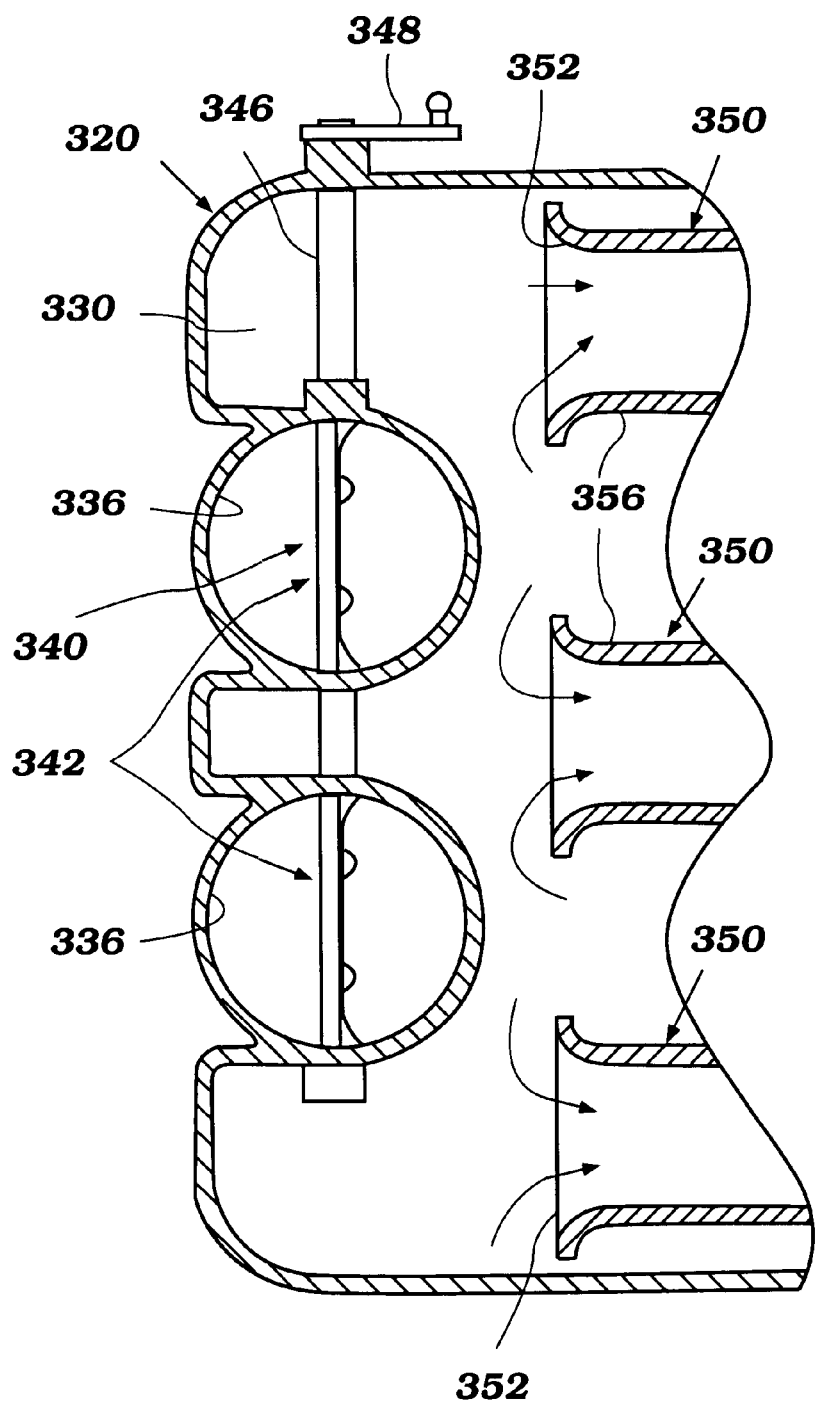
FIG. 6 is a sectional view of the air induction system taken along the line 6—6 of FIG. 5.
Figure 7:
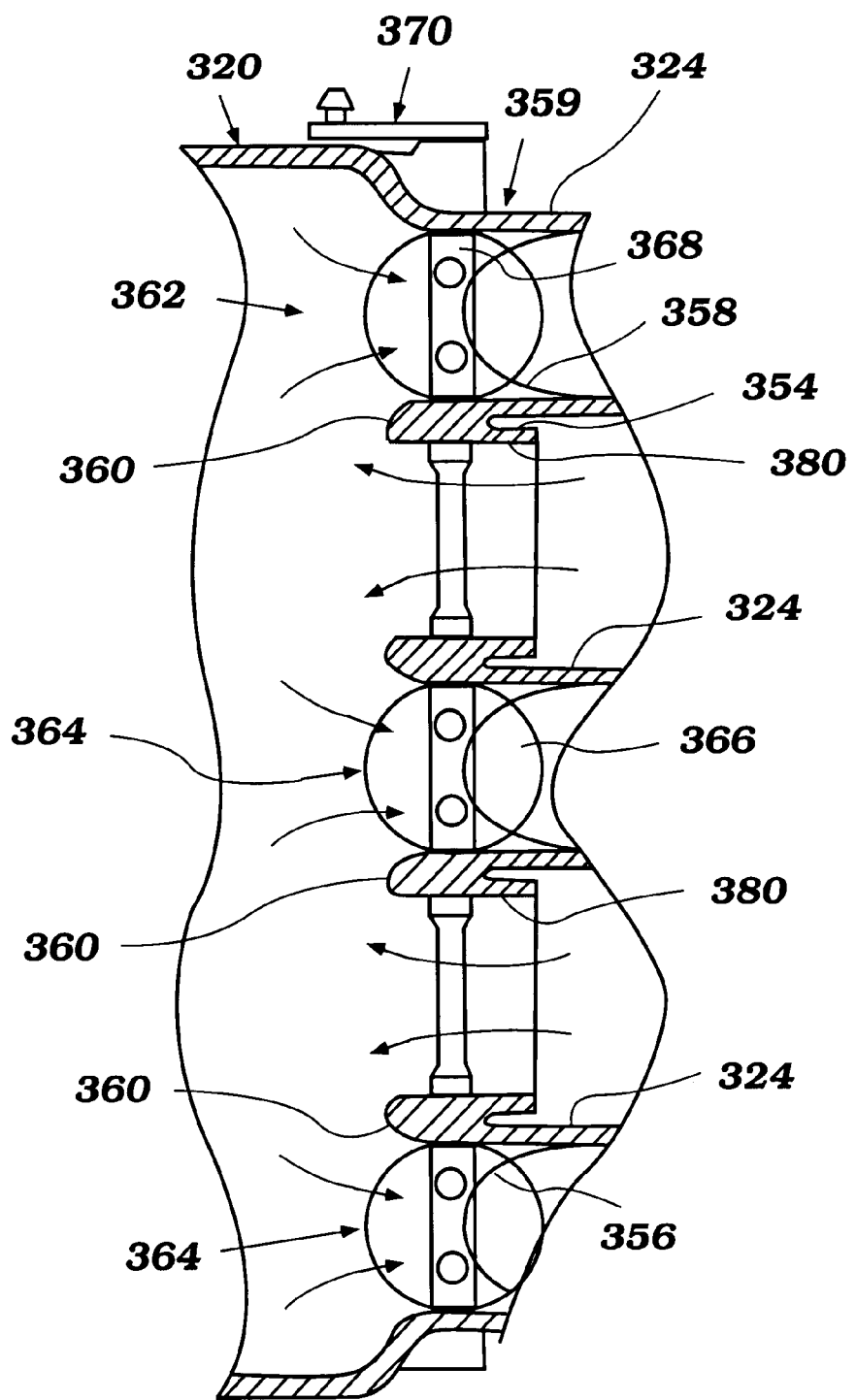
FIG. 7 is a sectional view of the air induction system taken along line 7—7 of FIG. 5.

With reference next to FIGS. 5–7, another embodiment of an outboard motor 232 includes an four stroke engine 232 having a V-type configuration. Since the engine 232 shares many similar components with the inline engine 32 described above, such components are denoted with the same reference numerals.

With reference specifically to FIG. 2, the engine 232 has a cylinder block 290 configured in a V shape. The cylinder block 290 thus provides two cylinder banks B1, B2 which extend side by side with each other. In the illustrated arrangement, cylinder bank B1 is disposed on the port side, while cylinder bank B2 is disposed on the starboard side. Each cylinder bank B1, B2 has three cylinder bores 92 such that the cylinder block 290 has six cylinder bores 92 in total. The cylinder bores 92 of each bank B1, B2 extend generally horizontally and are generally vertically spaced from one another.

As with the engine 32 described above, a piston 94 reciprocates within each cylinder bore 92. Connecting rods 108 couple the crankshaft 60 with respective pistons 94 in a suitable manner so that reciprocal movement of the pistons 94 rotates the crankshaft 60. A crankcase member 104 encloses a front end of the cylinder block 290 and, together with the cylinder block 290, defines a crankcase chamber 106 within which the crankshaft is journalled.

A cylinder head member 300 is affixed to a rear end of each cylinder bank 131, 132. The cylinder head members 300 together with the associated pistons 94 and cylinder bores 92 define six combustion chambers 102, three to each cylinder bank 131, 132.

The cylinder head members 300 each have inner intake passages 130 which communicate air from an air induction system 234 through intake ports 132 and into corresponding combustion chambers 102. The intake port 132 is selectively opened and closed by a valve 134. After combustion, exhaust gases exit the combustion chambers 102 through exhaust ports 142 that are also selectively opened and closed by valves 144.

Exhaust manifolds 246 preferably are defined generally vertically within the respective cylinder head assemblies 300. The exhaust manifolds 246 communicate with the combustion chambers 102 through the inner exhaust passages 140 and the exhaust ports 142 to collect exhaust gases therefrom. The exhaust manifolds 246 are coupled with the exhaust discharge passage of the exhaust guide member 76.

A valve cam mechanism preferably is provided for actuating the intake and exhaust valves 134, 144 in each cylinder bank B1, B2. In the illustrated embodiment, the valve cam mechanism includes two camshafts 150 per cylinder bank, which camshafts extend generally vertically and are journaled for rotation relative to the cylinder head assemblies

300. The camshafts 150 have cam lobes 154 to push valve lifters that are affixed to the respective ends of the intake and exhaust valves 134, 144 in any suitable manner. The cam lobes 154 repeatedly push the valve lifters in a timed manner, which is in proportion to the engine speed. The movement of the lifters generally is timed by rotation of the camshafts 150 to appropriately actuate the intake and exhaust valves 134, 144.

A camshaft drive mechanism (not shown) preferably is provided for driving the valve cam mechanism. Preferably, the intake and exhaust camshafts 150 comprise intake and exhaust driven sprockets positioned atop the intake and exhaust camshafts, respectively, while the crankshaft 60 has a drive sprocket positioned atop thereof. A timing chain or belt is wound around the driven sprockets and the drive sprocket. The crankshaft 60 thus drives the respective camshafts through the timing chain in the timed relationship. Because the camshafts must rotate at half of the speed of the rotation of the crankshaft 60 in a four-cycle engine, a diameter of the driven sprockets is twice as large as a diameter of the drive sprocket.

The engine 232 preferably employs other systems such as, for example, a fuel injection system, ignition or firing system, cooling system and lubrication system. The engine also preferably employs an ECU, which receives inputs from various sensors and controls certain engine components in response to such inputs so as to increase engine performance in various operating conditions. Various mechanisms and/or devices can also be used for the engine 232, for example, a flywheel assembly can be positioned atop the crankshaft 60 and can be journaled for rotation with the crankshaft. The flywheel assembly typically comprises a flywheel magneto or AC generator that supplies power to various electrical components, such as the fuel injection system, the ignition system and the ECU.

With continued reference to FIGS. 5–7, the air induction system 234 is specially configured to be tunable so as to maximize torque output at low/medium speeds as well as high engine speeds, while maintaining a compact arrangement. In the illustrated embodiment, the induction system 234 comprises an intake silencer 320 or plenum chamber positioned within the cowling 66 and generally forwardly of the engine body 110. Right and left intake manifolds 322 extend from the intake silencer 320 and along the right and left sides of the engine 232, respectively. The intake manifolds 322 each include a series of three upstream runners 324 which direct air from the silencer 320 to associated throttle bodies 128. The throttle bodies 128 each comprise a throttle valve 184, and regulate the flow of air through the runners 324, 326 in a manner as discussed above. Downstream runners 326 extend from the throttle bodies 128 and direct air to the corresponding inner intake passages 130 formed in the cylinder head assemblies 300.

As shown particularly in FIGS. 5 and 6, the intake silencer 320 comprises a dividing wall 330 that generally separates the silencer 320 into a right space 332 and a left space 334. Two connection passages 336 are formed through the dividing 330 wall to allow air to flow freely between the right and left spaces 332, 334. A dividing wall valve assembly 340 selectively closes the connection passages 336. The valve assembly 340 preferably includes butterfly valves 342, each of which comprises a valve plate 344 configured to rotate with a valve shaft 346. A top end of the valve shaft 346 is connected to an actuator 348, which is controlled by a motor, solenoid or the like so as to open or close the associated valves 343. Operation of the actuator is preferably controlled by the ECU in response to specified engine conditions.

With continued reference to FIGS. 5–7, three runner extension pipes 350 are integrally formed with each side of the intake silencer 320 and open into the intake silencer 320 at upstream opening 352. In the illustrated embodiment, the upstream openings 352 are trumpeted. The runner extension pipes 350 are formed partially by a rear wall 354 of the intake silencer 320 and inner pipe walls 356, which separate the runner extension pipes 350 from the space 332, 334 within the intake silencer 320. Each runner extension pipe 350 has a downstream opening 358 (see FIGS. 5 and 7) which opens through a side of an associated upstream runner 324 near an upstream end 359 of the runner 324.

As shown particularly in FIGS. 5 and 7, the upstream end 359 of each upstream runner 324 also opens into the intake silencer 320 through runner openings 360 formed through the rear wall 354 of the silencer 320. Runner opening valve assemblies 362 are disposed in the runner openings 360 so that the openings 360 can be selectively opened and closed. In the illustrated embodiment, the valve assemblies 362 include butterfly valves 364 comprising valve plates 366 mounted on a substantially vertical rotatable valve shaft 368 and configured to rotate with the shaft 368. A motor or other type of actuator 370 is attached to the shaft 368 and is configured to rotate the shaft 368 to effectuate opening and closure of the valves 364. The actuator 370 is controlled by the ECU so that the valves 364 are fully or partially opened and closed in response to specified engine operation conditions.

With continued reference to FIGS. 5 and 7, inlet passages 380 are formed through the rear wall 354 of the silencer 320 between the runner openings 360. The inlet passages 380 allow air from the cavity 62 within the cowling 60 to enter the intake silencer 320.

As discussed above, engine torque performance is improved at low and medium engine speeds by providing a relatively long intake passage. Engine torque performance is improved at high engine speeds by providing a somewhat reduced-length intake passage.

Accordingly, when the engine 232 is operated at low and medium engine speeds, the ECU directs the runner opening valve actuators 370 to close the runner opening valves 364. Air from the intake silencer 320 is thus prevented from entering the upstream runners 324 directly, and must instead flow through the runner extension pipes 350 before entering the upstream runners 324. The effective length of the intake passage (shown in dark arrows) from the silencer 320 to the combustion chamber 102 is thus relatively long. Additionally, since the inlet passages 380 are positioned at a side of the silencer 320 generally opposite the runner extension pipe upstream openings 352, the intake passage length is even further extended.

When the engine 232 is operated at high engine speeds, the ECU directs the runner opening valve actuators 320 to open the runner opening valves 364. As such, air from the silencer 320 can flow directly into the upstream runner 324, and the effective length of the intake passage (shown in dotted arrows) from the silencer to the combustion chamber 102 is relatively short this arrangement helps increase engine torque at high speeds. Additionally, since the inlet passages 380 are immediately adjacent the upstream runner openings 360, intake air is not required to flow very far through the intake silencer 320, thus helping to keep the effective intake passage relatively short.

In the illustrated embodiment, the intake silencer 320 has inlet passages 380 in both the right and left spaces 332, 334; also, intake passages 324, 350 withdraw air from both the right and left spaces 332, 334. When the dividing wall valves 342 are open, the chamber volume of the intake silencer 320 is maximized, but flow between the spaces 332, 334 could interfere with intake flow. At low and medium engine speeds, the ECU directs the dividing wall valves 342 to close so as to decrease or eliminate such intake interference. However, at high speeds, the advantages obtained from increased chamber volume outweigh any disadvantage of intake interference. Thus, at high engine speeds, the ECU directs the dividing wall valves 342 to be opened.

Of course, it is to be understood that, in some embodiments, it may be desired to partially, but not fully, open the upstream runner opening valves 364 and/or the dividing wall valves 342 during some engine conditions.

With specific reference to FIG. 5, the upstream runner opening valve plate 366 is configured so that, when closed, the plate 366 is substantially continuous with the inner wall 356 of the associated runner extension pipe 350. In this manner, the plate 366 is generally aligned with the flow direction generally defined by the pipe, 350, and flow resistance is avoided. Additionally, in the illustrated embodiment, the closed plate 366 engages the wall of the upstream runner pipe 324 at an angle so that the engagement does not create an abrupt direction change. This enables smooth, generally uninterrupted air flow past the closed valve 364. Still further, as shown in the drawings, the intake passage from the silencer 320 to the cylinder head assembly 300 avoids dramatic direction changes, such as turns of more than 180°, or even of more than 90°. This further helps decreases intake resistance.

The intake silencer 320 and runners 324, 326 in the embodiment shown in FIGS. 5–7 preferably are constructed of plastic in any suitable manner such as, for example, by injection molding. Other materials such as, for example, aluminum alloy and other methods such as, for example, a die casting method can be applied to form these members. In the illustrated embodiment, the runner extension pipes 350 are formed integrally with the intake silencer 320. It is to be understood, however, that the intake pipes can be formed separately from the intake silencer.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. An outboard motor comprising a power head having a cowling enclosing a space, an engine disposed within the cowling and configured to drive a substantially vertically oriented crankshaft, and an air induction system disposed within the cowling and configured to deliver air from the space into a combustion chamber of the engine, the air induction system comprising an intake silencer and at least one intake runner, the intake silencer having an outer wall, an inlet port through the wall for drawing air from the space into the intake silencer, a runner extension pipe integrally formed with the intake silencer, the runner extension pipe having an upstream end and a downstream end, the upstream end opening within the intake silencer and the downstream end opening into the intake runner, and a runner hole formed through the outer wall of the intake silencer and communicating with the intake runner at a point adjacent the downstream end of the runner extension pipe, a valve disposed in the outer hole and configured to selectively open and close the hole, and when the valve is closed, an intake passage is defined from the upstream end of the runner extension pipe to a downstream end of the runner pipe, and when the valve is opened, the intake passage is defined from the runner hole to the downstream end of the runner pipe.

2. The outboard motor of claim 1, wherein the runner extension pipe is partially formed by a portion of the outer wall.

3. The outboard motor of claim 2, wherein the runner extension pipe is defined between the portion of the outer wall and an inner pipe portion.

4. The outboard motor of claim 3, wherein the runner opening valve comprises a valve plate configured to generally block the runner opening, and the runner opening valve is configured so that when the valve is closed, a face of the valve plate is generally colinear with the inner pipe portion.

5. The outboard motor of claim 1, wherein closure of the runner opening valve is controlled by an electronic control unit.

6. The outboard motor of claim 1, wherein the intake silencer additionally comprises a dividing wall dividing the silencer into a first chamber and a second chamber, at least one connection passage formed through the dividing wall, and a dividing wall valve within the connection passage selectively closes the passage.

7. A method for controlling an induction system for an outboard motor, comprising providing the outboard motor of claim 6, providing an electronic control unit configured to receive an input signal indicative of engine speed and to control the actuation of the runner opening valve and the dividing wall valve, and closing the runner opening valve and dividing wall valve during low engine speeds, and opening the runner opening valve and dividing wall valve during high engine speeds.

8. An air induction system for improving the torque characteristics of an outboard marine engine and configured to be positioned within a limited space between the engine and an associated protective cowling, the induction system comprising an intake silencer and an intake manifold, the intake manifold comprising at least one generally linear runner extending from the silencer to the engine, the runner opening into the silencer at a runner opening, a runner opening valve disposed in the runner opening and configured to selectively close the opening, a runner extension having an upstream end opening into the silencer and a downstream end opening into the runner so that an intake passage between the silencer and the engine is effectively lengthened when the runner opening valve is closed.

9. The air induction system of claim 8, wherein a throttle body is disposed along the runner between the silencer and the engine.

10. The air induction system of claim 8, wherein the intake passage defines a generally linear flow path with no turn greater than about 180°.

11. The air induction system of claim 10, wherein the intake passage defines a generally linear flow path with no turn greater than about 90°.

12. The air induction system of claim 8, wherein the runner is configured to generally follow the curvature of an outer side wall of the cowling.

13. The air induction system of claim 8, wherein the runner extension is substantially contained within the intake silencer.

14. The air induction system of claim 13, wherein the runner extension is coformed with the intake silencer.

15. An air induction system for improving the torque characteristics of an engine, the induction system comprising an intake silencer and an intake manifold, the intake manifold comprising at least one runner extending from the silencer to the engine, the runner opening into the silencer at a runner opening, a runner opening valve disposed in the runner opening and configured to selectively close the opening, a runner extension having an upstream end opening into the silencer and a downstream end opening into the runner upstream of the engine.

16. The air induction system of claim 15, wherein a throttle body is disposed along the runner between the silencer and the engine.

17. The air induction system of claim 15, wherein the intake passage defines a generally linear flow path with no turn greater than about 180°.

18. The air induction system of claim 17, wherein the intake passage defines a generally linear flow path with no turn greater than about 90°.

19. The air induction system of claim 15, wherein the runner extension is substantially contained within the intake silencer.

20. The air induction system of claim 19, wherein the runner extension is coformed with the intake silencer.

21. A method of improving torque characteristics of an outboard motor engine at low, middle and high engine speeds, comprising:
providing an intake silencer and an intake conduit, the intake conduit extending from the intake silencer to an intake passage of the engine;
providing a second intake conduit extending from the intake silencer to a portion of the first intake conduit upstream of the engine;
automatically closing a valve between the silencer and the first intake conduit during low and medium engine speeds so as to provide a long flow path extending from the silencer through the second intake conduit and first intake conduit to the intake passage of the engine; and
automatically opening the valve between the silencer and the first intake conduit during high engine speeds so as to provide a shortened flow path extending from the silencer through the first intake conduit to the intake passage of the engine.

22. The method of claim 21, comprising providing a throttle along the first intake conduit.

23. The method of claim 21, wherein the second intake conduit is substantially contained within the silencer.

24. The method of claim 23, wherein the second intake conduit is formed integrally with the silencer.

25. The method of claim 21, wherein the intake silencer comprises two chambers separated by a dividing wall, and a balancing passage is formed through the wall, a balancing valve being positioned in the balancing passage, and comprising the steps of closing the balancing valve at low speeds so that each chamber functions as a separate intake silencer.

26. The method of claim 25 additionally comprising opening the balancing valve at high speeds so that the effective volume of the intake silencer comprises the collective volume of the two chambers.

27. An outboard motor comprising an engine, a protective cowling, and the air induction system of claim 15, wherein the induction system is configured to be positioned within a limited space between the engine and the protective cowling.

28. The outboard motor of claim 27, wherein the runner extension and the silencer are separated by a shared wall over at least a portion of the length of the runner extension.

29. The outboard motor of claim 28, wherein the runner opening is formed through the shared wall.

30. The outboard motor of claim 29, wherein the upstream end of the runner extension opens into the silencer through the shared wall.

31. The outboard motor of claim 28, wherein the runner opening valve is configured so that, when closed, it is substantially continuous with an inner wall of the runner extension pipe.

32. The outboard motor of claim 27, wherein the engine is configured to drive a substantially vertical crankshaft.

33. The outboard motor of claim 32, wherein the silencer is disposed generally in front of the engine.

34. The outboard motor of claim 33, wherein the runner extends generally rearwardly from the silencer and along a side of the engine.

35. The outboard motor of claim 34, wherein the runner is configured to generally follow the curvature of an outer side wall of the cowling.

36. The outboard motor of claim 27, wherein a silencer inlet is disposed adjacent the runner opening.

* * * * *